United States Patent
Sunkara et al.

(10) Patent No.: US 7,671,172 B2
(45) Date of Patent: *Mar. 2, 2010

(54) POLY(TRIMETHYLENE-ETHYLENE ETHER) GLYCOLS

(75) Inventors: Hari B. Sunkara, Hockessin, DE (US); Hiep Q. Do, Somerset, NJ (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/818,502

(22) Filed: Jun. 13, 2007

(65) Prior Publication Data

US 2008/0004403 A1      Jan. 3, 2008

Related U.S. Application Data

(63) Continuation of application No. 11/105,660, filed on Apr. 13, 2005, now Pat. No. 7,244,810, which is a continuation of application No. 10/621,892, filed on Jul. 17, 2003, now abandoned.

(60) Provisional application No. 60/402,262, filed on Aug. 9, 2002.

(51) Int. Cl.
   *C08J 3/07*      (2006.01)
   *C08G 65/34*   (2006.01)

(52) U.S. Cl. .................... 528/486; 528/425; 528/502 R

(58) Field of Classification Search ................ 528/425, 528/486, 502 R See application file for complete search history.

(56) References Cited

U.S. PATENT DOCUMENTS

| | | |
|---|---|---|
| 2,481,278 A | 9/1949 | Ballard et al. |
| 3,326,985 A | 6/1967 | Mason |
| 4,588,802 A | 5/1986 | Chang |
| 5,882,800 A | 3/1999 | Brennan et al. |
| 6,069,222 A | 5/2000 | Kaneda et al. |
| 6,562,457 B1 | 5/2003 | Goldfinger et al. |
| 6,590,065 B1 | 7/2003 | Goldfinger |
| 6,599,625 B2 | 7/2003 | Goldfinger et al. |
| 6,720,459 B2 | 4/2004 | Sunkara et al. |
| 6,852,823 B2 | 2/2005 | Sunkara et al. |
| 2002/0007043 A1 | 1/2002 | Sunkara et al. |
| 2004/0030089 A1 | 2/2004 | Sunkara |
| 2004/0077823 A1 | 4/2004 | Sunkara |
| 2004/0127673 A1 | 7/2004 | Sunkara |
| 2004/0185263 A1 | 9/2004 | Sormani et al. |
| 2004/0249061 A1 | 12/2004 | Sunkara et al. |

FOREIGN PATENT DOCUMENTS

WO    WO01/44348 A1    6/2001

OTHER PUBLICATIONS

International Search Report, date of mailing: Dec. 29, 2003.
Schmalz, Holger; Abetz, Volker; Lange, Ronald; Soliman, Maria, "New Thermoplastic Elastomers by Incorporation of Nonpolar Soft Segments in PBT-Based Copolyesters", Macromolecules 2001, 34, 795-800.
Supplementary Search Report by European Patent Office, date of mailing Oct. 12, 2005.
European Search Report for European Patent Application No. 08012524.8 Dated Nov. 19, 2008.

*Primary Examiner*—Duc Truong
(74) *Attorney, Agent, or Firm*—Gail D. Tanzer

(57) ABSTRACT

A poly(trimethylene-ethylene ether) glycol is disclosed. The poly(trimethylene-ethylene ether) glycol is, preferably, prepared by the polycondensation of 1,3-propanediol reactant and ethylene glycol reactant. The composition is preferably used in breathable membranes, synthetic lubricants, hydraulic fluids, cutting oils, motor oils, surfactants, spin-finishes, water-borne coatings, laminates, adhesives, packaging, films and foams, fibers and fabrics.

3 Claims, No Drawings

POLY(TRIMETHYLENE-ETHYLENE ETHER) GLYCOLS

CROSS REFERENCE TO RELATED APPLICATIONS

This application is a continuation of U.S. patent application Ser. No. 11/105,660, filed on Apr. 13, 2005, now U.S. Pat. No. 7,244,810 which is a continuation of U.S. patent application Ser. No. 10/621,892, filed on Jul. 17, 2003, now abandoned, which claims the benefit of U.S. Provisional Patent Application Ser. No. 60/402,262, filed on Aug. 9, 2002. These applications are incorporated herein by reference in their entirety.

FIELD OF THE INVENTION

This invention relates to polyether glycols, in particular, poly(trimethylene-ethylene ether) glycols and their manufacture and use.

BACKGROUND OF THE INVENTION

Polytrimethylene ether glycol ("PO3G") and its use have been described in a number of patents and patent applications. PO3G can be prepared by dehydration of 1,3-propanediol or by ring opening polymerization of oxetane. PO3G can be prepared from 1,3-propanediol, preferably as described in U.S. Published Patent Application Nos. 2002/7043 A1 and 2002/10374 A1, both of which are incorporated herein by reference.

U.S. Published Patent Application No. 2002/7043 A1 teaches that the reaction mixture can comprise up to 50 mole %, preferably 1 to 20 mole %, based on all diols present, of a comonomer diol other than oligomers of 1,3-propanediol. Listed are 2-methyl-1,3-propanediol, 2,2-dimethyl-1,3-propanediol, 2,2-diethyl-1,3-propanediol, 1,6-hexanediol, 1,8-octanediol, 1,10-decanediol, 1,12-dodecanediol and mixtures thereof. More preferred as comonomers are 2-methyl-1,3-propanediol, 2,2-dimethyl-1,3-propanediol, and 2,2-diethyl-1,3-propanediol.

Similarly, U.S. Published Patent Application No. 2002/10374 A1 teaches that the reaction mixture can comprise up to 50 mole %, preferably 1 to 20 mole %, based on all diols present, of a comonomer diol other than oligomers of 1,3-propanediol. Listed are aliphatic diols, for example 1,6-hexanediol, 1,7-heptanediol, 1,8-octanediol, 1,9-nonanediol, 1,10-decanediol, 1,12-dodecanediol, 3,3,4,4,5,5-hexafluoro-1,5-pentanediol, 2,2,3,3,4,4,5,5-octafluoro-1,6-hexanediol, 3,3,4,4,5,5,6,6,7,7,8,8,9,9,10,10-hexadecafluoro-1,12-dodecanediol, cycloaliphatic diols, for example 1,4-cyclohexanediol, 1,4-cyclohexanedimethanol and isosorbide, polyhydroxy compounds, for example glycerol, trimethylolpropane, and pentaerythritol. A preferred group of comonomer diol is selected from the group consisting of 2-methyl-1,3-propanediol, 2,2-dimethyl-1,3-propanediol, 2,2-diethyl-1,3-propanediol, 2-ethyl-2-(hydroxymethyl)-1,3-propanediol, 1,6-hexanediol, 1,8-octanediol, 1,10-decanediol, isosorbide, and mixtures thereof.

Polyether ester elastomer comprising polytrimethylene ether ester soft segment and tetramethylene and trimethylene ester hard segments are described in U.S. Pat. No. 6,562,457 B1 and U.S. Published Patent Application No. 2003/120026 A1, both of which are incorporated herein by reference. Polytrimethylene ether ester amides are described in U.S. Pat. No. 6,590,065 B1, which is incorporated herein by reference. Polyurethanes and polyurethane ureas are described in U.S. patent application Ser. No. 10/215,575, filed Aug. 9, 2002 (published as US 2004-0030060 A1), which is incorporated herein by reference.

Polytrimethylene ether glycol is preferably prepared by polycondensation of 1,3-propanediol, preferably using an acid catalyst as described in U.S. Published Patent Application Nos. 2002/7043 A1 and 2002/10374 A1. Polyethylene glycol, on the other hand, is made from the ring-opening polymerization of ethylene oxide, and can not be polymerized from ethylene glycol by acid catalyzed polycondensation due to the cyclization of its dimer into dioxane.

SUMMARY OF THE INVENTION

The invention is directed to poly(trimethylene-ethylene ether) glycol, its manufacture and use. The poly(trimethylene-ethylene ether) glycol preferably has a molecular weight of 250 to about 10,000, more preferably of at least about 1,000 to about 5,000. According to one aspect, a composition comprises poly(trimethylene-ethylene ether) glycol and additive. Preferably, the additive comprises at least one each of at least one of delustrant, colorant, stabilizer, filler, flame retardant, pigment, antimicrobial agent, antistatic agent, optical brightener, extender, processing aid, viscosity booster and mixtures thereof.

The poly(trimethylene-ethylene ether) glycol is preferably prepared by polycondensation of 1,3-propanediol reactant and ethylene glycol reactant. Preferably, the 1,3-propanediol reactant is selected from the group consisting of 1,3-propanediol, and oligomers of 1,3-propanediol having a degree of polymerization of 2 to 3, and mixtures thereof. Preferably, the ethylene glycol reactant is selected from the group consisting of ethylene glycol, and oligomers of ethylene glycol having a degree of polymerization of 3 to 4, and mixtures thereof. More preferably the poly(trimethylene-ethylene ether) glycol is prepared by the polycondensation of 1,3-propanediol and ethylene glycol.

Preferably the polycondensation is carried out with an acid polycondensation catalyst. Preferably, the polycondensation catalyst is homogeneous, preferably sulfuric acid.

In accordance with one aspect, the poly(trimethylene-ethylene ether) glycol is prepared by a process comprising the steps of:
  (a) providing (1) 1,3-propanediol reactant, (2) ethylene glycol reactant and (3) and acid polycondensation catalyst; and
  (b) polycondensing the 1,3-propanediol and ethylene glycol reactants in the presence of the acid polycondensation catalyst to form poly(trimethylene-ethylene ether) glycol.

In accordance with another aspect, the poly(trimethylene-ethylene ether) glycol is prepared by a continuous process comprising:
  (a) continuously providing (i) 1,3-propanediol reactant, (ii) ethylene glycol reactant and (iii) acid polycondensation catalyst; and
  (b) continuously polycondensing the 1,3-propanediol and ethylene glycol reactants in the presence of the acid polycondensation catalyst to form poly(trimethylene-ethylene ether) glycol.

In accordance with another aspect, the poly(trimethylene-ethylene ether) glycol is prepared by a semi-continuous process comprising the steps of:
  (a) batch polycondensing 1,3-propanediol reactant in the presence of acid polycondensation catalyst; and
  (b) adding ethylene glycol reactant to the batch polycondensing over time.

According to one embodiment, the poly(trimethylene-ethylene ether) glycol is a block copolymer of polyethylene oxide and polytrimethylene oxide. Preferably, the molecular weight of the block copolymer is at least about 1000, preferably up to about 20,000.

In accordance with another embodiment, the poly(trimethylene-ethylene ether) glycol is used in at least one of breathable membranes, synthetic lubricants, hydraulic fluids, cutting oils, motor oils, surfactants, spin-finishes, water-borne coatings, laminates, adhesives, packaging, films and foams, fibers and fabrics. Preferably the poly(trimethylene-ethylene ether) glycol is used as a base polymer in synthetic lubricants and spin finish formulations and in water-borne coatings.

According to another aspect of the present invention, the poly(trimethylene-ethylene ether) glycol is used as a soft segment to make block copolymers.

In one embodiment, the block copolymers comprise block poly(trimethylene-ethylene ether) ester as a soft segment with a polymeric hard segment. The preferred polymeric hard segment is selected from esters and amides.

The polyether esters are preferably thermoplastic elastomer, preferably comprising $C_2$ to $C_{12}$ alkylene ester as the hard segment. These polyether esters preferably comprise about 90 to about 10 weight % poly(trimethylene-ethylene ether) glycol soft segment and about 10 to about 90 weight % alkylene ester hard segment, based on the total amount of hard and soft segments. Also preferably, the mole ratio of hard segment to soft segment is at least about 2.0, more preferably, about 2.0 to about 4.5.

The polyether esters can be prepared by providing and reacting
(a) poly(trimethylene-ethylene ether) glycol,
(b) at least one diol, and
(c) at least one of dicarboxylic acid, ester, acid chloride and acid anhydride.

The polyether esters can also be prepared by providing and reacting:
(a) poly(trimethylene-ethylene ether) glycol, and
(b) at least one polyester.

Another aspect in accordance with the present invention relates to fiber prepared from a poly(trimethylene-ethylene ether) glycol soft segment and alkylene ester hard segment. A further aspect relates to fabric made from the fiber. A still further aspect relates to films and membranes made from the block copolymer.

The poly(trimethylene-ethylene ether) amide is also preferably a thermoplastic elastomer. Preferably it comprises polyamide hard segments joined by ester linkages to poly(trimethylene-ethylene ether) soft segments. Preferably, the polyamide hard segment is the reaction product of carboxyl terminated polyamide or diacid anhydride, diacid chloride or diester acid equivalent thereof.

In a further aspect, a polyurethane or polyurethane urea (thermoplastic elastomer) comprises poly(trimethylene-ethylene ether) as a soft segment. Preferably, the hard segment comprises polyurethane or polyurethane urea. The polyurethane/polyurethane urea preferably comprises less than 90 weight %, more preferably less than about 70 weight %, or less than about 50 weight % soft segment. Additional details regarding the polyurethane/polyurethane urea hard segment are described in pending U.S. application Ser. No. 10/215,575, filed Aug. 9, 2002 (published as US 2004-0030060 A1), which is incorporated herein by reference in its entirety.

DETAILED DESCRIPTION OF THE INVENTION

Unless otherwise stated, all percentages, parts, ratios, etc., are by weight.

Further, when an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed.

The invention is directed to poly(trimethylene-ethylene ether) glycols. The poly(trimethylene-ethylene ether) glycol has a number average molecular weight (Mn) of at least 250, preferably at least about 500, more preferably at least about 1,000, even more preferably at least about 1,500 and most preferably about 2,000. The Mn is preferably up to about 10,000, more preferably up to about 5,000, even more preferably up to about 4,000, yet even more preferably up to about 3,000, and more preferably up to about 2,500. Reference herein to molecular weight, unless otherwise indicated is to Mn.

The poly(trimethylene-ethylene ether) glycol is preferably prepared from 1,3-propanediol reactant and ethylene glycol reactant. It is preferably prepared by polycondensation of 1,3-propanediol reactant and ethylene glycol reactant, more preferably by the polycondensation of 1,3-propanediol and ethylene glycol.

By "1,3-propanediol reactant" is meant 1,3-propanediol, its dimers, and trimers, and mixtures thereof. In addition, "polytrimethylene ether glycol" and "poly(trimethylene-ethylene ether) glycol" are used to refer to polymers having a Mn of 250 or more.

By "ethylene glycol reactant" is meant ethylene glycol, and its trimers and tetramers. In addition, "polyethylene glycol" is used to refer to polymers having a Mn of 250 or more. Diethylene glycol will cyclize to dioxane during acid catalyzed polycondensation and, therefore, its presence should preferably be kept to a minimum.

Preferably the 1,3-propanediol reactant is selected from the group consisting of 1,3-propanediol, and oligomers of 1,3-propanediol having a degree of polymerization of 2 to 3, and mixtures thereof.

Preferably the ethylene glycol reactant is selected from the group consisting of ethylene glycol, and oligomers of ethylene glycol having a degree of polymerization of 3 to 4, and mixtures thereof.

In one preferred embodiment, the 1,3-propanediol reactant is 1,3-propanediol.

In one preferred embodiment, the ethylene glycol reactant is ethylene glycol.

The preferred starting materials for this invention are 1,3-propanediol and ethylene glycol, and in some instances for simplicity, applicants will refer to 1,3-propanediol and ethylene glycol in describing the invention. The 1,3-propanediol can be obtained from a petrochemical or renewable source.

The poly(trimethylene-ethylene ether) glycols are preferably prepared using at least about 1 mole %, preferably at least about 2 mole % and more preferably at least about 10 mole %, and preferably up to about 50 mole %, more preferably up to about 40 mole %, and most preferably up to about 30 mole %, of ethylene glycol reactant based on the total amount of 1,3-propanediol reactant and ethylene glycol reactant. The poly(trimethylene-ethylene ether) glycols are preferably prepared using up to about 99 mole %, preferably up to about 98 mole %, and preferably at least about 50 mole %, more preferably at least about 60 mole %, and most preferably at least about 70 mole %, of 1,3-propanediol reactant based on the total amount of 1,3-propanediol reactant and ethylene glycol reactant.

The process can be batch, semi-continuous, continuous, etc., and the ethylene glycol can be added prior to or during the reaction. The poly(trimethylene-ethylene ether) glycols of the invention are preferably prepared using the methods described in U.S. Published Patent Application Nos. 2002/7043 A1 and 2002/10374 A1, both of which are incorporated herein by reference in their entireties, with further reaction of the ethylene glycol with the 1,3-propanediol reactant.

Thus, in one preferred embodiment, the poly(trimethylene-ethylene ether) glycol is prepared by a process comprising the steps of: (a) providing (1) 1,3-propanediol reactant, (2) ethylene glycol reactant and (3) acid polycondensation catalyst; and (b) polycondensing the 1,3-propanediol and ethylene glycol reactants to form a poly(trimethylene-ethylene ether) glycol. Preferably, the reaction is conducted at elevated temperatures for example about 150 to about 210° C., and preferably at atmospheric pressure or preferably at less than one atmosphere pressure. In one preferred embodiment thereof, the process comprises the steps of: (a) providing 1,3-propanediol, ethylene glycol and acid polycondensation catalyst; (b) condensing 1,3-propanediol and ethylene glycol reactants to form oligomers or prepolymers thereof having an average degree of polymerization of 2 to 20, preferably 2 to 9, or a mixture comprising one or more thereof; and (c) polycondensing the oligomer or prepolymer or mixture to form a poly(trimethylene-ethylene ether) glycol at atmospheric inert gas pressure or less than one atmosphere pressure or at atmospheric pressure in an inert atmosphere, preferably nitrogen. Preferably step b) is carried out at about atmospheric pressure, the pressure in step c) is less than 300 mm Hg (40 kPa), the temperature in step b) is about 150 to about 210° C. and the temperature in step c) is about 150 to about 250° C.

The poly(trimethylene-ethylene ether) glycols of the present invention can be produced continuously using the procedure of U.S. Published Patent Application No. 2002/10374 A1. Thus, in another preferred process, the poly(trimethylene-ethylene ether) glycol is prepared by a continuous process comprising: (a) continuously providing (i) 1,3-propanediol and ethylene glycol reactants, and (ii) polycondensation catalyst; and (b) continuously polycondensing the reactants to form poly(trimethylene-ethylene ether) glycol. Preferably the polycondensing is carried out in two or more reaction stages. Preferably the polycondensing is carried out at a temperature greater than about 150° C., more preferably greater than about 180° C. and preferably less than about 250° C., more preferably less than about 210° C. Preferably the polycondensation is carried out at a pressure of less than one atmosphere, preferably at least about 50 mm Hg. In one preferred continuous process the polycondensation is carried out in an up-flow co-current column reactor and the 1,3-propanediol reactant, ethylene glycol reactant and poly(trimethylene-ethylene ether) glycol flow upward co-currently with the flow of gases and vapors, preferably where the reactor has 3 to 30 stages, more preferably 8 to 15 stages. The 1,3-propanediol reactant can be fed to the reactor at one or multiple locations. In another preferred embodiment, the polycondensation is carried out in a counter current vertical reactor wherein the 1,3-propanediol and ethylene glycol reactants and poly(trimethylene-ethylene ether) glycol flow in a manner counter-current to the flow of gases and vapors. Preferably the reactor has two or more stages. Preferably the 1,3-propanediol reactant and ethylene glycol reactant are fed at the top of the reactor, and preferably the ethylene glycol reactant is also fed at multiple locations to the reactor. In yet another preferred embodiment, the polycondensation is first carried out in at least one prepolymerizer reactor and then continued in a column reactor, the 1,3-propanediol reactant comprises 90 weight % or more 1,3-propanediol and the ethylene glycol reactant comprises 90 weight % or more ethylene glycol, and in the prepolymerizer reactor the 1,3-propanediol is polymerized with the catalyst to a degree of polymerization of at least 5. Most preferably, in the at least one prepolymerizer reactor the 1,3-propanediol and ethylene glycol are polymerized with the catalyst to a degree of polymerization of at least 10 and the column reactor comprises 3 to 30 stages. Preferably the at least one prepolymerizer reactor is a well-mixed tank reactor.

In another embodiment, the poly(trimethylene-ethylene ether) glycol is prepared by a semi-continuous process comprising the steps of: (a) batch polycondensing 1,3-propanediol reactant in the presence of acid polycondensation catalyst; and (b) adding ethylene glycol reactant to the batch polycondensing over time.

The polycondensation catalysts preferred for these reactions are described in U.S. Published Patent Application Nos. 2002/7043 A1 and 2002/10374 A1. They include homogeneous catalysts such as Lewis Acids, Bronsted Acids, super acids, and mixtures thereof. Examples include inorganic acids, organic sulfonic acids, heteropolyacids, and metal salts thereof. Preferred are sulfuric acid, fluorosulfonic acid, phosphorus acid, p-toluenesulfonic acid, benzenesulfonic acid, phosphotungstic acid, phosphomolybdic acid, trifluoromethanesulfonic acid, 1,1,2,2-tetrafluoro-ethanesulfonic acid, 1,1,1,2,3,3-hexafluoropropanesulfonic acid, bismuth triflate, yttrium triflate, ytterbium triflate, neodymium triflate, lanthanum triflate, scandium triflate and zirconium triflate. Heterogeneous catalysts, such as zeolites, fluorinated alumina, acid-treated silica, acid-treated silica-alumina, heteropolyacids and heteropolyacids supported on zirconia, titania, alumina and/or silica, can also be used. Preferred are the aforementioned homogeneous catalysts, and most preferred is sulfuric acid.

The poly(trimethylene-ethylene ether) glycol prepared from the above process is optionally purified as described in U.S. Published Patent Application Nos. 2002/7043 A1 and 2002/10374 A1, or by other means. Sometimes, it is desired to hydrolyze the sulfate ester groups present in the polymer to improve functionality of the polymer for use as an intermediate in the preparation of thermoplastic elastomers. The functionality of the polymer refers to the number of hydroxyl groups per molecule. In general, the functionality of poly(trimethylene-ethylene ether) glycol is close to 2 because very few polymer molecules may contain unsaturation ends. Depending upon the application, the water soluble low molecular weight fraction is either removed from the polymer or retained. The acid present in the polymer is either removed or neutralized with a soluble base. Neutralization with a base is accompanied by the formation of alkali metal salt. If insoluble base is used to neutralize the acid present in the polymer, the salts formed can be removed by filtering the polymer.

The conventional additives commonly used in polyether glycols and thermoplastic elastomers can be incorporated into the 1,3-propanediol reactant, the ethylene glycol reactant, the poly(trimethylene-ethylene ether) glycols, and the thermoplastic elastomers and other products made from the poly(trimethylene-ethylene ether) glycols, by known techniques. Such additives include delusterants (e.g., $TiO_2$, zinc sulfide or zinc oxide), colorants (e.g., dyes), stabilizers (e.g., antioxidants, ultraviolet light stabilizers, heat stabilizers, etc.), fillers, flame retardants, pigments, antimicrobial agents, antistatic agents, optical brighteners, extenders, processing aids, viscosity boosters, and other functional additives. As a specific example, an antioxidant prevents oxidation of polyethers that are subject to oxidation during storage. A preferred antioxidant stabilizer is butylated hydroxy toluene or BHT, used at a level of about 50 to about 500 micrograms/g based on the weight of the polymer. The most preferred level is about 100 micrograms/g.

The invention is also directed to poly(trimethylene-ethylene ether) glycol block copolymer. In one preferred embodiment, the block copolymer is made using polyethylene glycol and polytrimethylene glycol. The preferred molecular weight of the block copolymer is at least about 1,000, more preferably at least about 2,000, or at least about 4,000. The molecular weight of the block copolymer is preferably up to about 20,000, more preferably up to about 10,000, or up to about 5,000.

The weight % of polyethylene glycol used to make the block copolymer is at least about 10%, preferably at least about 20%, or at least about 30%, based on the total amount of polyethylene glycol and polytrimethylene glycol. The weight % of polyethylene glycol in the block copolymer can be up to about 70%, preferably up to about 50%, or up to about 40%.

Block copolymer can be made in various ways. For example, polyethylene glycol and polytrimethylene glycol of varying chain lengths can be reacted as described above. Also for example, homopolymer of polyethylene glycol can be added to a reactor containing 1,3-propanediol and the mixture reacted in the presence of the acid catalyst, for example, as described above.

The poly(trimethylene-ethylene ether) glycols can be used in the same manner as polytrimethylene ether glycols, as well as in other applications where these polyether glycols can be tailored to perform. For example, they are useful, as a base polymer in synthetic lubricants such as hydraulic fluids, cutting oils, and motor oils to provide low friction/traction. They are also useful as surfactants, spin-finishes, in water-borne coatings, and in making thermoplastic elastomers. They can be used in injection molding, blow molding, extrusion and compression molding, and reactive extrusion in the manufacture of coatings, laminates and adhesives, in the manufacture of packaging and industrial films, in the manufacture of other melt processable products, in the manufacture of foams and cast elastomers, and in the manufacture of fibers and fabrics. Examples of thermoplastic elastomers include poly(trimethylene-ethylene ether) ester elastomers, poly(trimethylene-ethylene ether) amides, and polyurethane or polyurethane urea elastomers such as described in the above-referenced U.S. Pat. No. 6,562,457 B1, U.S. Published Patent Application 2003/120026 A1, U.S. Pat. No. 6,590,065 B1 and U.S. patent application Ser. No. 10/215,575 (published as US 2004-0030060 A1).

In another aspect, the invention is directed to polyether ester comprising poly(trimethylene-ethylene ether) ester soft segment(s) and alkylene ester hard segment(s). These are block copolymers, and preferably are thermoplastic elastomers. They preferably contain $C_2$ to $C_{12}$ alkylene ester hard segments, preferably $C_2$-$C_4$ alkylene ester hard segments. Preferred are dimethylene ester, trimethylene ester and tetramethylene ester hard segment, the latter two for example, as described in U.S. Pat. No. 6,562,457 B1 and in U.S. Patent Application Publication No. 2003/120026 A1, both of which are incorporated herein by reference. The preferred polyether ester elastomers, as well as their preparation and use, is basically the same as described in U.S. Pat. No. 6,562,457 B1 and U.S. Patent Application Publication No. 2003/120026 A1.

The polyether ester elastomer preferably comprises about 90 to about 10 weight % poly(trimethylene-ethylene ether) ester soft segment and about 10 to about 90 weight % alkylene ester hard segment. They preferably contain at least about 90 to about 60 weight % of poly(trimethylene-ethylene ether) ester soft segment and about 10 to about 40 weight % alkylene ester hard segment. More preferably, they comprise at least about 70% or about 74 weight %, poly(trimethylene-ethylene ether) ester soft segment, and preferably contain up to about 85, more preferably up to about 82 weight %, poly(trimethylene-ethylene ether) ester soft segment. They preferably contain at least about 15 weight %, more preferably at least about 18 weight %, and preferably contain up to about 30 weight %, more preferably up to about 26 weight %, alkylene ester hard segment.

The mole ratio of hard segment to soft segment is preferably at least about 2.0, more preferably at least about 2.5, and is preferably up to about 4.5, more preferably up to about 4.0.

The polyether ester can be made by providing and reacting (a) poly(trimethylene-ethylene ether) glycol and (b) at least one polyester. Preferably, the polyester is at least one of polyethylene terephthalate, polytrimethylene terephthalate and polytetramethylene terephthalate. The polyether ester is preferably prepared by providing and reacting (a) poly(trimethylene-ethylene ether) glycol, (b) diol, preferably 1,4-butanediol, 1,3-propanediol or 1,2-ethanediol, and (c) at least one of dicarboxylic acid, ester, acid chloride or acid anhydride. Preferably, the dicarboxylic acid, ester, acid chloride or acid anhydride is an aromatic dicarboxylic acid or ester, more preferably selected from the group consisting of dimethyl terephthalate, bibenzoate, isophthlate, phthalate and naphthalate; terephthalic, bibenzoic, isophthalic, phthalic and naphthalic acid; and mixtures thereof. Most preferred are terephthalic acid and dimethyl terephthalate. The polyether esters can be made using polycondensation catalyst, for example, Tyzor® TPT (tetra-isopropoxide titanate), sold by E.I. duPont de Nemours and Company.

The invention is also directed to films, membranes and fibers prepared from the polyether ester. Preferred fibers include monocomponent filament, staple fiber, multicomponent fiber such as bicomponent fiber (containing the polyether ester as at least one component). The fibers are used to prepare woven, knit and nonwoven fabric.

The polyether esters of this invention can be used to prepare melt spinnable thermoplastic elastomers having excellent strength and stretch-recovery properties. The polyether esters of this invention can be used to prepare membranes having high breathability.

In another embodiment, the invention is directed to poly (trimethylene-ethylene ether) amide comprising poly(trimethylene-ethylene ether) soft segment and a polyamide hard segment. These are, preferably, elastomeric poly(trimethylene-ethylene ether) amides, and are similar to the polytrimethylene ether amides described in U.S. Pat. No. 6,590,065 B1, which is incorporated herein by reference, and their manufacture and use. These are block polymers. They contain poly(trimethylene-ethylene ether) soft segments and polyamide hard segments.

The polyamide segment preferably has an average molar mass of at least about 300, more preferably at least about 400. Its average molar mass is preferably up to about 5,000, more preferably up to about 4,000 and most preferably up to about 3,000.

The poly(trimethylene-ethylene ether) ester amide preferably comprises 1 up to an average of up to about 60 polyalkylene ether ester amide repeat units. Preferably it averages at least about 5, more preferably at least about 6, polyalkylene ether ester amide repeat units. Preferably it averages up to about 30, more preferably up to about 25, polyalkylene ether ester amide repeat units.

The weight percent of polyamide segment, also sometimes referred to as hard segment, is preferably at least about 10% and most preferably at least about 15% and is preferably up to about 60%, more preferably up to about 40%, and most preferably up to about 30%. The weight percent of poly(trimethylene-ethylene ether) segment, also sometimes referred to as soft segment, is preferably up to about 90%, more preferably up to about 0.85%, and is preferably at least about 40%, more preferably at least about 60% and most preferably at least about 70%.

The poly(trimethylene-ethylene ether) ester amide preferably comprises polyamide hard segments joined by ester linkages to poly(trimethylene-ethylene ether) soft segments and is prepared by reacting carboxyl terminated polyamide or diacid anhydride, diacid chloride or diester acid equivalents thereof and polyether glycol under conditions such that ester linkages are formed. Preferably it is prepared by reacting carboxyl terminated polyamide and polyether glycol comprising at least 50 weight %, more preferably at least 75 weight %, and most preferably about 85 to 100 weight %, poly(trimethylene-ethylene ether) glycol.

In one preferred embodiment the carboxyl terminated polyamide is the polycondensation product of lactam, amino-acid or a combination thereof with dicarboxylic acid. Preferably, the carboxyl terminated polyamide is the polycondensation product of $C_4$-$C_{14}$ lactam with $C_4$-$C_{14}$ dicarboxylic acid. More preferably, the carboxyl terminated polyamide is the polycondensation product of lactam selected from the group consisting of lauryl lactam, caprolactam and undecanolactam, and mixtures thereof, with dicarboxylic acid selected from the group consisting of succinic acid, adipic acid, suberic acid, azelaic acid, sebacic acid, undecanedioic acid, dodecanedioic acid, terephthalic acid, and isophthalic acid, and mixtures thereof. Alternatively, the carboxyl terminated polyamide is the polycondensation product of amino-acid with dicarboxylic acid, preferably $C_4$-$C_{14}$ amino-acid and preferably $C_4$-$C_{14}$ dicarboxylic acid. More preferably, the carboxyl terminated polyamide is the polycondensation product of amino-acid selected from the group consisting of 11-amino-undecanoic acid and 12-aminododecanoic acid, and mixtures thereof, with dicarboxylic acid selected from the group consisting of succinic acid, adipic acid, suberic acid, azelaic acid, sebacic acid, undecanedioic acid, dodecanedioic acid, terephthalic acid, and isophthalic acid, and mixtures thereof.

In another preferred embodiment, the carboxyl terminated polyamide is the condensation product of a dicarboxylic acid and diamine. Preferably, the carboxyl terminated polyamide is the condensation product of a $C_4$-$C_{14}$ alkyl dicarboxylic acid and $C_{4-14}$ diamine. More preferably, the polyamide is selected from the group consisting of nylon 6-6, 6-9, 6-10, 6-12 and 9-6.

The invention is also directed to shaped articles comprising the poly(trimethylene-ethylene ether) amide. Preferred shaped articles include fibers, fabrics and films.

Polyurethanes and polyurethane ureas such as those described in U.S. patent application Ser. No. 10/215,575, filed Aug. 9, 2002 (published as US 2004-0030060 A1), which is incorporated herein by reference, can be prepared with the poly(trimethylene-ethylene ether) glycols of the invention as soft segments therein. Melt processable, and solution processable polyurethanes and polyurethane ureas can be made from poly(trimethylene-ethylene ether) glycol soft segment. These polyurethanes and polyurethane ureas can be used as described therein. Poly(trimethylene-ethylene ether) based polyurethane ureas can be used to make fibers by melt-spinning and other techniques.

Preferably, the poly(trimethylene-ethylene ether) glycol has a number average molecular weight (Mn) of at least 250, preferably at least about 500, more preferably at least about 1,000, even more preferably at least about 1,500 and most preferably about 2,000. The Mn is preferably up to about 10,000, more preferably up to about 5,000, even more preferably up to about 4,000, yet even more preferably up to about 3,000, and more preferably up to about 2,500.

The hydrophilic-lipophilic balance of the poly(trimethylene-ethylene) glycol can be altered by changing the ethylene glycol content in the polymer. In addition, the polymer lipophilic character can be increased by extracting the water soluble oligomer fraction from the polymer.

The polyurethane/polyurethane urea preferably comprises at least about 90 weight %, more preferably greater than about 50 weight %, or greater than about 10 weight % soft segment.

Polyurethane prepolymers can be made by reacting poly (trimethylene-ethylene ether) glycol with a diisocyanate. For example, they can be made by a process comprising:
(a) providing (i) diisocyanate and (ii) poly(trimethylene-ethylene ether) glycol having a number average molecular weight in the range of about 1,000 to about 5,000; and
(b) reacting the diisocyanate and the poly(trimethylene-ethylene ether) glycol while maintaining an NCO:OH equivalent ratio of about 1.1:1 to about 10:1 to form the diisocyanate-terminated polyether-urethane prepolymer.

Polyurethane polymers can be made, for example, by a process comprising:
(a) reacting (i) diisocyanate and (ii) poly(trimethylene-ethylene ether) glycol having a number average molecular weight in the range of about 1,000 to about 5,000 while maintaining an NCO:OH equivalent ratio of about 1.1:1 to about 10:1 to form diisocyanate-terminated polyether-urethane prepolymer;
(b) reacting the diisocyanate-terminated polyether-urethane prepolymer with diol chain extender at an OH:NCO mole ratio of about 0.75:1 to about 1.15:1, or with diamine chain extender at $NH_2$:NCO mole ratio of about 0.85:1 to about 1.10:1, to form the polyurethane or the polyurethane-urea.

Preferably, the polyurethane or polyurethane-urea is cured.

According to another aspect, the polyurethane or polyurethane-urea can be made by a process comprising:
(a) providing (i) diisocyanate, (ii) poly(trimethylene-ethylene ether) glycol having a number average molecular weight in the range of about 1,000 to about 5,000 and (iii) diol or diamine chain extender; and
(b) reacting the diisocyanate, the poly(trimethylene-ethylene ether) glycol, and the diol or diamine chain extender to form the polyurethane or the polyurethane-urea.

According to yet another aspect, the polyurethane or polyurethane-urea can be made by a process comprising:
(a) providing (i) diisocyanate-terminated polyether-urethane prepolymer and (ii) diol or diamine chain extender; and
(b) reacting the diisocyanate-terminated polyether-urethane prepolymer with the diol chain extender at an OH:NCO mole ratio of about 0.75:1 to about 1.15:1, or with diamine chain extender at $NH_2$:NCO mole ratio of about 0.85:1 to about 1.10:1, more to form the polyurethane or the polyurethane-urea.

Preferably, the diol chain extender is selected from the group consisting of ethylene glycol, 1,2-propylene glycol, 1,3-propanediol, 1,4-butanediol, 1,6-hexanediol, diethylene glycol, 2-methyl-1,3-propanediol, 3-methyl-1,5-pentanediol, 2,2-dimethyl-1,3-propanediol, 2,2,4-trimethyl-1,5-pentanediol, 2-methyl-2-ethyl-1,3-propanediol, 1,4-bis(hydroxyethoxy)benzene, bis(hydroxyethylene)terephthalate, hydroquinone bis(2-hydroxyethyl)ether, and combinations thereof. Also preferably, the diamine chain extender is selected from the group consisting of 1,2-ethylenediamine, 1,6-hexanediamine, 1,2-propanediamine, 4,4'-methylene-bis (3-chloroaniline), dimethylthiotoluenediamine, 4,4'-diaminodiphenylmethane, 1,3-diaminobenzene, 1,4-diaminobenzene, 3,3'-dimethoxy-4,4'-diamino biphenyl, 3,3'-dimethyl-4,4'-diamino biphenyl, 4,4'-diamino biphenyl, 3,3'-dichloro-4,4'-diamino biphenyl, and combinations thereof. Also preferably, the diisocyanate is selected from the group 2,4-toluene diisocyanate, 2,6-toluene diisocyanate, 4,4'-diphenylmethane diisocyanate, 4,4'-dicyclohexylmethane diisocyanate, 3,3'-dimethyl-4,4'-biphenyl diisocyanate, 1,4-benzene diisocyanate, trans-cyclohexane-1,4-diisocyanate, 1,5-naphthalene diisocyanate, 1,6-hexamethylene diisocyanate, 4,6-xylyene diisocyanate, isophorone diisocyanate, and combinations thereof.

Preferably, the ratio of total reactive groups contained in the poly(trimethylene-ethylene) ether glycol and chain extender components to the isocyanate groups is greater than 1. More preferably, the ratio of total reactive groups contained in the poly(trimethylene-ethylene) ether glycol and chain extender components to the isocyanate groups is 0.8 to 1.

Optionally, the poly(trimethylene-ethylene ether) glycol is blended with other polyether glycol(s). Preferably, the poly (trimethylene-ethylene ether) glycol is blended with up to 50 weight % of other polyether glycol. Preferably, the other polyether glycol is selected from the group consisting of polyethylene glycol, poly(1,2-propylene glycol), polytrimethylene glycol, polytetramethylene glycol and combinations thereof.

Preferably, the poly(trimethylene-ethylene ether) glycol comprises water soluble and water insoluble chains. Preferably, the water soluble chains are less than 1 wt % of total polymer. More preferably, the water soluble chains are less than 0.5 wt % of total polymer.

The poly(trimethylene-ethylene ether) glycols of the present invention have a number of advantages. Poly(trimethylene-ethylene ether) glycols have primary reactive hydroxyl groups to provide good reactivity towards the functional groups such as isocyanate or carboxylic acid or its ester. Poly(trimethylene-ethylene ether) glycols containing more than 10 wt % ethylene oxide are completely amorphous and not crystallizable and these are preferred for low temperature properties. The glycols are liquid at room temperature and have low viscosities, so they are easier to store, transport, and process compared to solid polyether glycols. Furthermore, for some applications requiring polyether glycols having more hydrophilic nature, the hydrophilic character of poly (trimethylene-ether) glycol can be altered by incorporating the desired levels of ethylene oxide units in the polymer. Increased hydrophilicity is expected to enhance the biodegradability of the polyether glycol as well.

The poly(trimethylene-ethylene ether) glycols have very good properties for use in thermoplastic elastomers. For instance, their reduced crystallinity (as compared to the corresponding polytrimethylene ether glycols) provides a more amorphous character in the soft segments in the thermoplastic elastomers. In addition, they have increased hydrophilicity. As a result, thermoplastic elastomers made with them will have better breathability.

This invention allows the practitioner to alter the properties of the polyether glycols significantly, giving the practitioner the ability to tailor make polyethers glycols, particularly the ability to alter the degree of crystallinity, crystallization kinetics, melting point and hydrophilicity, while still retaining the basic characteristics of the polytrimethylene ether glycols. Most notably this can be done using an acid-catalyzed polycondensation which is efficient and convenient.

The invention is also very economical due to the ability to use the acid-catalyzed polycondensation process, and the greater availability and lower cost of ethylene glycol compared to 1,3-propanediol. The poly(trimethylene-ethylene ether) glycol of the present invention can be made from the use of bio derived monomer such as 1,3-propanediol.

EXAMPLES

The following examples are presented for the purpose of illustrating the invention, and are not intended to be limiting. All parts, percentages, etc., are by weight unless otherwise indicated.

In all the Examples, a commercial grade of 1,3-propanediol having a purity of >99.8% was used (available from DuPont). The ethylene glycol was from Aldrich and had a purity of ~98%.

The number-average molecular weights (Mn) of polyether glycol were determined either by analyzing end-groups using NMR spectroscopic methods or by titration of hydroxyl groups.

Polydispersity (Mw/Mn) of the polymer was measured by GPC.

Melting point ($T_m$), crystallization temperature ($T_c$) and glass transition temperature ($T_g$) were determined using the procedure of the American Society for Testing Materials ASTM D-3418 (1988) using a DuPont DSC Instrument Model 2100 (E. I. du Pont de Nemours and Co., Wilmington, Del. ("DuPont")), according to the manufacturer's instructions. The heating and cooling rates were 10° C. per minute.

ASTM method D445-83 and ASTM method D792-91 were used to determine the absolute (dynamic) viscosity and density of the polymer, respectively.

Example 1

Poly(trimethylene-ethylene ether) glycol was prepared from 1,3-propanediol (86 mole %) and ethylene glycol (14 mole %) as follows:

135 g (1.78 moles) of 1,3-propanediol and 18 g of ethylene glycol (0.29 mole, corresponding to 14 mole %) were charged into a 250-mL 4-neck flask that was equipped with a glass shaft, a nitrogen inlet connector, and a port for a thermal couple. The mixture was purged with nitrogen (0.15 L/min) for 5 minutes under ambient temperature and pressure. 1.53 g of concentrated sulfuric acid was slowly added to the mixture at room temperature. The reactor was operated under atmospheric pressure and nitrogen atmosphere at 170° C. for 13 hours. 34 ml of distillate (mostly water) was collected at the end of the run. After polymerization, 121 g of distilled water was charged into the crude polymer that was then stirred for 4 hrs at 100° C. under nitrogen atmosphere. Most of the acid present was extracted after cooling the mixture to 35° C. to 40° C., and separating the aqueous layer from the polymer phase. The residual acid present in the polymer was neutralized with Ca(OH)$_2$ (0.01 g) slurry at 60° C. for 2 hours under nitrogen atmosphere. The copolymer was dried to remove residual water present using a rotovap under 29 in—Hg pressure and 100° C. temperature. Finally, the dried polymer was filtered hot through a precoated 1 µm Whatman filter paper. The polymer properties are reported in Table 1.

Example 2

Poly(trimethylene-ethylene ether) glycol was prepared from 1,3-propanediol (95 mole %) and ethylene glycol (5 mole %) as follows:

Example 1 was repeated by varying the amount of 1,3-propanediol (149.1 g), ethylene glycol (6.40 g, corresponding to 5 mole %) and 1.55 g of sulfuric acid.

Example 3

Poly(trimethylene-ethylene ether) glycol was prepared from 1,3-propanediol (70 mole %) and ethylene glycol (30 mole %) as follows:

Example 1 was repeated by varying the amount of 1,3-propanediol (109.9 g), ethylene glycol (38.4 g, corresponding to 30 mole %) and of sulfuric acid (1.48 g).

Example 4

Poly(trimethylene-ethylene ether) glycol was prepared from 1,3-propanediol (70 mole %) and ethylene glycol (30 mole %) as follows:

Example 3 was scaled up in a 5-L reactor. 2197.2 g (70 mole %) of 1,3-propanediol and 768.2 g (30 mole %) of ethylene glycol were charged into the reactor. 29.69 g (1 wt % of total raw material) of sulfuric acid was added. The polymer properties are reported in Table 1

Example 5

Example 3 was repeated except the polymerization temperature was maintained at 160° C. for 35 hours. The polymer properties after purification are reported in Table 1.

Example 6

Poly(trimethylene-ethylene ether) glycol was prepared from 1,3-propanediol (70 mole %) and ethylene glycol (30 mole %) in a 20 L reactor as follows:

8.81 kg of 1,3-propanediol, 3.081 kg of ethylene glycol and 0.109 kg of concentrated sulfuric acid were charged into the reactor. The mixture was purged with nitrogen gas for 30 minutes and the reaction mixture was heated to 160° C. The polymerization reaction was continued for 25 hours at inert atmospheric pressure while collecting the water of reaction. The polymer properties are reported in Table 1.

Example 7

In this experiment, poly(trimethylene-ethylene ether) glycol was prepared in a semi-batch process by adding ethylene glycol (30 mole %) dropwise into 1,3-propanediol (70 mole %) as follows:

109.3 g (1.78 moles) of 1,3-propanediol was charged into a 250-mL reactor that has similar setup to the one in Example 1. The 1,3-propanediol was purged with nitrogen at 0.15 L/min for 10 minutes at ambient temperature and pressure. 1.49 g of concentrated sulfuric acid was added dropwise to the 1,3-propanediol. The mixture was heated under a nitrogen blanket to 170° C. Once the 160° C. temperature was reached, ethylene glycol addition was started at rate of 1 drop/9 seconds over the course of 2 hours. The polymerization was conducted for 12 hours at 170° C. and atmospheric pressure. 34 ml of distillate was collected at the end of the end of 12 hrs. Purification steps followed Example 1. The polymer properties are reported in Table 1.

Comparative Example A (Control)

Polytrimethylene ether glycol was prepared by repeating Example 1 without using ethylene glycol.

Example 8

Example 3 was repeated with diethylene glycol by replacing ethylene glycol as follows: 109.9 g of 1,3-propanediol, 65.7 g of diethylene glycol and 1.77 g of concentrated sulfuric acid were charged into a 250 mL reactor. The polymerization was carried out 170° C. under nitrogen. After 6 hours, the reaction mixture turned dark brown and the experimental run was stopped. During 6 hours of the reaction, 89.2 mL of distillate was collected and the distillate contained significant amount of organics besides water as determined by the refractive index of the distillate indicating formation of cyclic dioxane from diethylene glycol.

Example 9

Block poly(trimethylene-ethylene ether) glycol was prepared from 1,3-propanediol (90 mole %) and polyethylene glycol (Mn=400, 10 mole %) as follows: 70.6 g (0.93 moles) of 1,3-propanediol and 41.4 g of polyethylene glycol (0.103 mole, corresponding to 10 mole %) were charged into a 250 mL reactor equipped with a glass shaft, a nitrogen inlet connector, and a port for a thermal couple. Nitrogen was purged through the mixture at a flow rate of 0.15 L/min for 10 minutes under ambient temperature and pressure. 1.1360 g (1 wt %) of concentrated sulfuric acid was added at 120° C. The polymerization was carried out at 160° C. for ~1 h and at 170° C. for 12 h under nitrogen. 20.0 ml of distillate was collected at the end of the run.

After polymerization, 92 g of distilled water was charged into the crude polymer that was then stirred for 4 hrs at 10° C. under a nitrogen blanket. Most of the acid present was extracted after cooling the mixture to 45° C. to 50° C. and separating the aqueous layer from the polymer phase. The crude polymer was charged again with 92 g of distilled water and stirred for 1 h at 100° C. under a nitrogen blanket. After cooling the mixture, the two layers were separated. The residual acid present in the polymer was neutralized with Ca(OH)$_2$ (0.0634 g) slurry at 60° C. for 2 hours under nitrogen atmosphere. The copolymer was dried to remove residual water present using a rotovap under 29 in—Hg pressure and 100° C. temperature for 3 h. Finally, the dried polymer was filtered hot through a precoated 1 µm Whatman filter paper. The block copolymer molecular weight was determined from NMR and found to be 2110.

The polymers and their properties are compared in the following table.

TABLE 1

Properties of Poly(trimethylene-ethylene ether) glycols

| Example | Ethylene glycol mole % | Mn (NMR) | Mn (Titration) | Mw/Mn | Tm, °C. | Tc, °C. | Tg, °C. | Viscosity at 40° C., cP |
|---|---|---|---|---|---|---|---|---|
| 1 | 14 | 1,889 | 1,847 | 1.64 | None | None | −75 | 530 |
| 2 | 5 | 2,262 | — | 1.59 | 1.5, 6.9 | −17 | −75 | 790 |
| 3 | 30 | 1517 | 1521 | 1.63 | None | None | −75 | 280 |
| 4 | 30 | 1245 | — | 1.60 | None | None | −75 | — |
| 5 | 30 | 2223 | — | — | None | None | −75 | — |
| 6 | 30 | 1385 | — | 1.56 | None | None | −75 | 277 |
| 7 | 30 | 1810 | 1823 | 1.64 | None | None | −75 | 420 |
| A (Control) | | 1,858 | 1,910 | 1.61 | 20 | −37 | −75 | 530 |

As shown in the Table, the Tg and polydispersity of the poly(trimethylene-ethylene ether) glycols are in the same range of the polytrimethylene ether glycol and the viscosity of the copolyether having molecular weight 1847 is about the same with the homopolymer; however, the melting point and crystallization temperatures of the poly(trimethylene-ethylene ether) glycols differed significantly from the polytrimethylene ether glycol.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the disclosure.

What is claimed is:

1. A process comprising:
   (a) providing (1) 1,3-propanediol reactant, (2) ethylene glycol reactant and (3) an acid polycondensation catalyst selected from the group comprising of sulfuric acid, fluorosulfonic acid, p-toluenesulfonic acid, benzenesulfonic acid, trifluoromethanesulfonic acid, 1,1,2,2 tetrafluoroethanesulfonic acid, and 1,1,1,2,3,3 hexafluoropropanesulfonic acid;
   (b) polycondensing the 1,3-propanediol and ethylene glycol reactants in the presence of the acid polycondensation catalyst to form poly(trimethylene-ethylene ether) glycol; and
   (c) hydrolyzing the poly(trimethylene-ethylene ether)glycol from step (b) to remove sulfate ester groups.

2. A process comprising:
   (a) continuously providing (i) 1,3-propanediol reactant, (ii) ethylene glycol reactant and (iii) acid polycondensation catalyst;
   (b) continuously polycondensing the 1,3-propanediol and ethylene glycol reactants in the presence of the acid polycondensation catalyst to form poly(trimethylene-ethylene ether)glycol; and
   (c) hydrolyzing the poly(trimethylene-ethylene ether)glycol from step (b) to remove sulfate ester groups.

3. A process comprising:
   (a) batch polycondensing 1,3-propanediol reactant in the presence of an acid polycondensation catalyst; and
   (b) adding ethylene glycol reactant to the batch polycondensing over time; and
   (c) hydrolyzing the poly(trimethylene-ethylene ether)glycol from step (b) to remove sulfate ester groups.

* * * * *